March 18, 1930.                G. W. SPRENGER                1,751,426
                              INSTRUMENT SCALE PLATE
                              Filed Sept. 24, 1929

Inventor:
George W. Sprenger
by Charles V. Tulla
His Attorney.

Patented Mar. 18, 1930

1,751,426

UNITED STATES PATENT OFFICE

GEORGE W. SPRENGER, OF LYNN, MASSACHUSETTS, ASSIGNOR TO GENERAL ELECTRIC COMPANY, A CORPORATION OF NEW YORK

INSTRUMENT SCALE PLATE

Application filed September 24, 1929. Serial No. 394,894.

My invention relates to indicating instruments and the chief object of my invention is to provide an instrument of the smallest practicable dimensions with a short and rigid indicating pointer traversing a graduated scale of the maximum practicable length.

The proper navigation of an aeroplane under all flying conditions requires that the aeroplane be equipped with instruments indicating those factors that influence navigation as for example, altitude of the aeroplane, quantity of gasoline and lubricating oil in the tanks, pressure of the lubricating oil feed to the engine and propeller, direction in which the aeroplane is flying, engine speed, etc. It is desirable that the pilot can easily read small variations in the indications of these instruments which therefore should be constructed with readable scales having a maximum length. The satisfaction of this requirement with the use of the ordinarily constructed instrument would make their dimensions such that the assembly of the various desirable instruments in an aeroplane would introduce the following disadvantages: The instruments would be spread out over a larger area, thus occupying too much space and requiring more effort from the pilot in making continual observations of their indications. The increased dimensions of the instruments would increase their weight and this is objectionable in an aeroplane which is a heavier than air machine and in which all parts must be kept at the minimum weight. The increased scale length of the instruments would require correspondingly longer indicating pointers, thus increasing the tendency of adverse influence on their indications from vibration existing in the aeroplane. It is therefore desirable to construct the instrument so as to avoid these enumerated disadvantages and at the same time retain the advantage of having as long a scale as possible. This highly desirable result is accomplished by my invention which will be best understood from the following description considered in connection with the accompanying drawings while the features of my invention which are believed to be novel and patentable are pointed out in the claims appended hereto.

Figure 1:
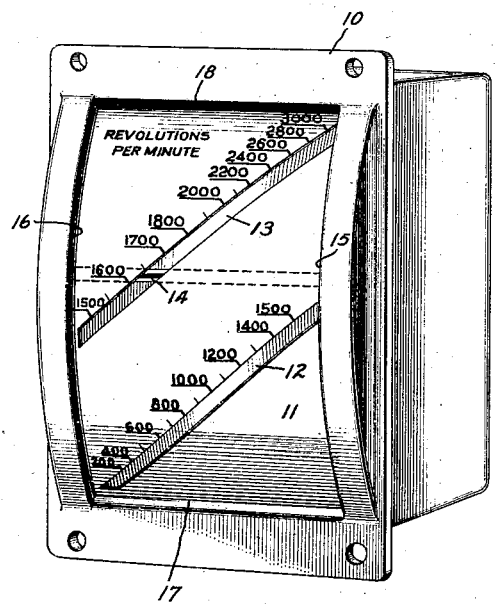
Figure 1A:
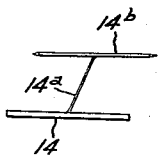
Figure 2:
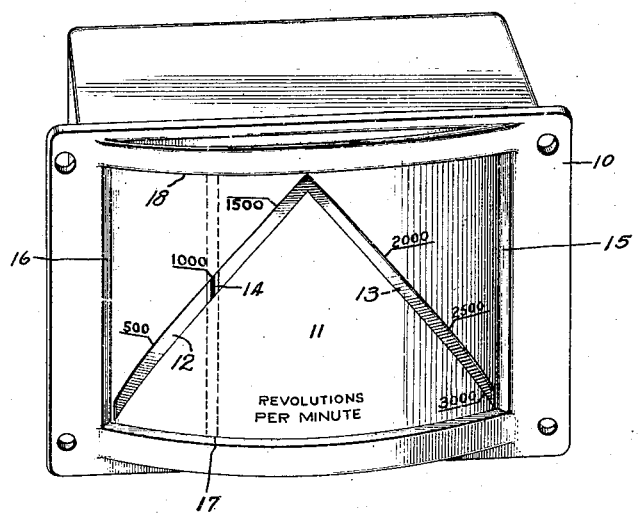

Fig. 1 represents a preferred embodiment of my invention as applied to an instrument having a horizontal pointer moving in a vertical direction. Fig. 1A represents the usual method of mounting the indicating pointer of the instrument shown in Fig. 1. Fig. 2 represents a preferred embodiment of my invention as applied to an instrument having a vertical pointer moving in a horizontal direction.

Fig. 1 represents a preferred embodiment of my invention as applied to a speed indicating instrument having an indicating pointer moving in a vertical direction, or more accurately in a vertical arc. In this figure 10 represents the instrument case, 11 represents the scale plate, 12 and 13 represent two graduated diagonal scales consisting of two diagonal slots in the scale plate 11, and 14 represents the outer end or target of the indicating pointer. It will be understood that the horizontal or visible target portion of the pointer is supported on an arm or arms which are pivoted about a horizontal axis near the back central portion of the instrument case. The complete pointer with its shaft is represented in reduced size in Fig. 1A. The target portion 14 is on the outer end of an arm $14^a$ and the entire pointer is mounted on a horizontal shaft $14^b$. It will be understood that shaft $14^b$ is rotated in response to speed by suitable speed responsive measuring apparatus contained within the case but not shown. Rotation of shaft $14^b$ on a horizontal axis moves the indicating portion 14 of the pointer through a vertical arc just back of the scale plate which is curved accordingly. For convenience the portion 14 of the pointer will hereinafter be referred to as the pointer. The width of the scale plate 11 is represented by the distance between 15 and 16 whereas its length is represented by the distance between 17 and 18. The length of the pointer 14 is equal to or is slightly greater than the width of the scale plate 11. The pointer 14 moves in a vertical direction and is capable of traversing the entire length of the scale plate but only a part of the pointer 14 is usually visible through one of the diagonal slots 12 or 13. Although each graduated slot represents one-half of the total speed range it is evident that this proportion may vary according to the construction and range of the instrument. It is preferable to have overlapping of the proper slot ends so that at no time will the pointer 14 be invisible and thus fail to indicate the speed. As shown in Fig. 1, this overlapping may be obtained by making the distance from the upper end of the slot 12 to the edge 17 slightly greater than the distance from the lower edge of the slot 13 to the edge 17.

The operation and advantages of my invention will be clear from the following description. I will assume that the engine whose speed is to be indicated by the instrument is not running and therefore the pointer 14 will be visible through the bottom of scale 12, thus indicating zero speed. Now I will assume that the engine has been started and its speed is increasing. The pointer 14 will move upwards in a vertical direction traversing the slot 12 and indicating the engine speed and it is clear that a continually varying portion of the pointer 14 will be visible during this upward movement. When the speed has reached 1500 R. P. M. the pointer 14 will be visible through both scales due to the above mentioned overlapping of the slot ends. When the speed has reached 1600 R. P. M. the pointer 14 will have moved upwards so it will be visible only through the scale 13 and as the speed increases the pointer will continue to move upwards traversing the slot 13 and indicating the engine speed up to the capacity of the instrument and it is clear that a continually varying portion of the pointer 14 will be visible during this movement. It is clear that the reverse will be true when the engine speed is decreased to zero speed. It is evident that although the pointer 14 has actually moved in a vertical path yet by means of my invention I have produced the equivalent effect of the pointer 14 moving over diagonal paths. It is clear that the total length of these two diagonal slots is greater than a vertical slot between 17 and 18. In this manner I produce the equivalent effect of the pointer 14 moving over a longer distance than would be represented by a vertical slot. The following comparisons will show the advantages of my invention. If the scale plate had a vertical slot with a speed range of 3000 R. P. M. subdivided in the same manner as slots 12 and 13, the graduations on the vertical slot would be smaller than the graduations on slots 12 and 13 and thus with my invention the speed indications can be more accurately observed. If however it is desired to retain the same size graduations in the vertical slots and in the slots 12 and 13, my invention will permit of the observance of smaller speed variations. For a vertical slot having the same equivalent length of the diagonal slots it would be necessary to materially increase the dimensions of the instrument to obtain the same degree of visibility. Merely increasing the vertical dimensions of the instrument to accommodate a vertical scale of the same equivalent length of the diagonal scales 12 and 13 would not be satisfactory since then the arc of curvature would be greater and the upper and lower portions of the scale would not be clearly visible to an observer in one position in front of the instrument. It would also be necessary to increase the radius of the pointer or to increase the length of the arm portion 14$^a$ so as to flatten the longer scale to retain the same degree of visibility with the vertical scale. This would necessitate increasing the depth of the instrument. In other words, to obtain the same degree of visibility with the usual type of scale it would be necessary to increase the height and depth of the instrument. Thus, by means of my invention I have materially increased the visibility of an indicating instrument of given dimensions or I have materially reduced the dimensions of the instrument for a given degree of visibility. The new arrangement also decreases the length of the indicating pointer, thereby making it more rigid and decreasing the undesirable tendency to vibrate.

From inspection of Fig. 1 it is evident that in some cases it may be satisfactory to have only one diagonal slot whose lower end would coincide with the lower end of the slot 12 and whose upper end would coincide with the upper end of the slot 13, or this single diagonal slot could extend between the other corners of the edges 17 and 18. On the other hand, in some cases it may be desirable to have the slots 12 and 13 arranged differently than shown in Fig. 1, as for example the upper end of slot 12 would merge with the lower end of slot 13 and the lower end of slot 12 would be in the opposite corner of the edge 17; or if desired the lower end of slot 13 would merge with the upper end of slot 12 and the upper end of slot 13 would be in the opposite corner of edge 18. Again, it might be desirable to have more than two separate diagonal slots, or two or more separate diagonal slots connected by one or more diagonal slots, or it might be desirable to have one, or more than one, diagonal slot connected by one or more than one vertical slot. The advantages gained by any combination of slots will be approximately proportional to the increased length of the combination over the vertical slot. It is evident that many other combinations of slots than those described can readily suggest themselves to those skilled in the art without departing from the spirit and scope of my invention.

Fig. 2 represents a preferred embodiment of my invention as applied to a speed indicating instrument having an indicating pointer moving in a horizontal direction. In this figure 10 represents the instrument case, 11 represents the scale plate, 12 and 13 represent two diagonal scales consisting of two diagonal slots in the scale plate 11, and 14 represents the indicating pointer. The width of the scale plate 11 is represented by the distance between 15 and 16, whereas its length is represented by the distance between 17 and 18. The length of the pointer 14 is equal to or slightly greater than the length of the scale plate 11. The axis of rotation of the pointer is vertical and the pointer 14 moves in a horizontal direction and is capable of traversing the entire width of the scale plate 11 but only a part of the pointer 14 is usually visible through one of the diagonal slots 12 or 13. Although each graduated slot represents one-half of the total speed range it is evident that this proportion may vary according to the construction and range of the instrument. It is preferable to have overlapping of the proper slot ends so that at no time will the pointer 14 be invisible and thus fail to indicate the speed. As shown in Fig. 2, this overlapping may be obtained by merging the upper ends of the slots 12 and 13. The operation and advantages of my invention as applied to the instrument shown in Fig. 2 will be readily apparent from the description accompanying Fig. 1 and hence need not be repeated. The advantages to be gained from any combination of slots, the slot combinations described and the slot combinations that may suggest themselves to those skilled in the art without departing from the true spirit and scope of my invention will apply to the embodiment shown in Fig. 2 equally as well as to the embodiment shown in Fig. 1.

It is highly probable that the instruments shown in Figs. 1 and 2 will have glass windows over their scale plates to make the instruments dust-proof and prevent air currents from influencing the pointer indications and at the same time not impair the visibility of the exposed portion of the pointer. As this glass window will be about the same size as the scale plate it might be desirable in some cases to have the glass window also serve as the scale plate and the following descriptions are examples of how this may be accomplished. Graduated paper scales could be pasted in a diagonal manner on the outside or on the inside of the glass cover, though the inside would be preferable. These paper scales would be of a white color, whereas the movable pointer would be a black color and this strong color contrast would render an easy observance of that portion of the paper scale that is in direct visual line with the pointer and thus easy reading of the indicating pointer could be had. On the other hand, it might be desirable to omit the paper scales and have the glass window covered with diagonal strips of white enamel with the figures etched into the glass adjacent to the strips and the depressions of the etched figures could be coated with white enamel. The movable pointer would be of a black color and this strong color contrast would render an easy observance of that portion of the white enamel strip that is in direct visual line with the black pointer and thus easy reading of the indicating pointer could be had. In some cases it might be satisfactory to omit the white enamelled strips and only provide the glass window with etched figures impressed thereon in a diagonal direction and whose depressions would be coated with white enamel and thus offer a strong contrast to the black pointer and result in easy reading of the indicating pointer. It is evident that all these modifications as well as similar modifications that may suggest themselves to those skilled in the art are all based on the fundamental principle of my invention and hence are within the spirit and scope of my invention.

While I have described my invention in connection with a speed indicating instrument having two diagonal slots and an indicating pointer moving in a horizontal or vertical direction, it will be evident that these are merely for the purpose of illustration and that my invention is equally applicable to any instrument having an indicating pointer. Also, while I have described my invention in connection with an indicating pointer located behind the scale plate it is evident that my invention is equally applicable where the indicating pointer is located in front of the scale plate. Accordingly I wish it understood that my invention is not to be limited to the embodiments shown and that such other modifications as fall within the true spirit and scope of my invention are intended to be included within the scope of the appended claims.

What I claim as new and desire to secure by Letters Patent of the United States, is:

1. An indicating instrument having at least one diagonal scale and a movable pointer suitably arranged with respect to the said scale whereby the movement of the said pointer will cause a continually varying portion of the said scale to be in direct visual line with a continually varying portion of the said movable pointer.

2. An indicating instrument having at least two diagonal scales and a movable pointer suitably arranged with respect to the said scales whereby the movement of the said pointer will cause a continually varying portion of one of the said scales to be in direct visual line with a continually varying portion of the said movable pointer, the said scales having overlapping ends whereby simultaneously there will be a portion of the said pointer in direct visual line with the end of one scale and a different portion of the said pointer in direct visual line with the beginning of the next scale in the direction of the said pointer travel, thereby always insuring a portion of the same pointer in direct visual line with a portion of one of the said scales.

3. An indicating instrument containing a scale plate having at least one diagonal slot, and a movable pointer suitably arranged behind the said scale plate whereby the movement of the said pointer across the said scale plate will cause a continuously varying portion of the said pointer to be exposed through the said slot.

4. An indicating instrument containing a scale plate having at least two diagonal slots, and a movable pointer suitably arranged behind the said scale plate whereby the movement of the said pointer across the said scale plate will cause a continuously varying portion of the said pointer to be exposed through one of the said slots, the said slots having overlapping ends whereby simultaneously there will be a portion of the said pointer exposed through the end of one slot and a different portion of the said pointer exposed through the beginning of the next slot in the direction of the said pointer travel, thereby always insuring an exposed portion of the said pointer through one of the said slots.

5. An indicating instrument containing a scale plate having two graduated diagonal slots each of which embraces substantially one-half of the total indicating range, the said slots having overlapping ends at the central indicating range, and a movable pointer suitably arranged behind the said scale plate whereby the movement of the said pointer from end to end of the scale plate will consecutively cause the exposure of a continuously varying portion of the said pointer through one of the said slots, the exposure of different portions of the said pointer through both of the said slots and finally the exposure of a continuously varying portion of the said pointer through the other of the said slots.

6. An indicating instrument containing a scale plate having reference characters impressed thereon in a diagonal direction and a movable pointer suitably arranged behind the said scale plate whereby the movement of the said pointer across the said scale plate will cause a continuously varying portion of the said pointer to be adjacent to the successive reference characters.

7. An indicating instrument having a pointer and a graduated scale with which said pointer cooperates to produce an indication, said scale extending in a direction diagonal to the direction of movement of the pointer.

In witness whereof I have hereunto set my hand this 20th day of September, 1929.

GEORGE W. SPRENGER.